United States Patent [19]

Hart et al.

[11] Patent Number: 4,850,654
[45] Date of Patent: Jul. 25, 1989

[54] FREIGHT BRAKE EMERGENCY VALVE

[75] Inventors: James E. Hart, Trafford; Edward W. Gaughan, Irwin; Theodore B. Hill, North Versailles, all of Pa.

[73] Assignee: American Standard Inc., Wilmerding, Pa.

[21] Appl. No.: 296,642

[22] Filed: Jan. 13, 1989

[51] Int. Cl.⁴ .................... B60T 11/34; B60T 15/30; B60T 17/04
[52] U.S. Cl. ........................................ 303/33; 303/37; 303/82
[58] Field of Search ................... 303/33, 36, 37, 38, 303/39, 42, 66, 69, 82, 81, 83, 86

[56] References Cited

U.S. PATENT DOCUMENTS

| 2,939,746 | 6/1960 | Pickert | 303/33 X |
| 4,690,463 | 9/1987 | Hart | 303/33 X |
| 4,744,609 | 5/1988 | Weber, Jr. | 303/37 |
| 4,770,472 | 9/1988 | Weber, Jr. et al. | 303/82 X |

OTHER PUBLICATIONS

"AB" Single Capacity Freight Car Air Brake Equipment with the ABD Control Valve, published Sep. 1979.

"AB" Single Capacity Freight Car Air Brake Equipment with the ABDW Control Valve, published Nov. 1980.

Primary Examiner—Douglas C. Butler
Attorney, Agent, or Firm—G. J. Falce

[57] ABSTRACT

An improved freight brake emergency valve device providing improved stability against undesired emergency brake applications without degradation of emergency sensitivity. This is achieved, in one aspect of the invention, by introducing a spring force on the emergency piston as the piston approaches emergency position to thereby retard the piston momentum sufficently to allow a random brake pipe pressure fluctuation to dissipate. In another aspect of the invention, a choke and check valve are arranged to create a dashpot effect to retard piston momentum resulting from a random brake pipe pressure fluctuation.

10 Claims, 2 Drawing Sheets

PRIOR ART

FREIGHT BRAKE EMERGENCY VALVE

BACKGROUND OF THE INVENTION

Undesired emergency brake applications have long been a source of concern to railroads. While many causes of undesired emergencies have been suggested, randomly occurring brake pipe pressure pulsations have now been identified as a contributing cause of undesired emergencies. These short term, relatively high rate pressure fluctuations seem to be due mainly to the dynamic effects of slack run-in and run-out during over-the-road train operation. Tests have shown that during this slack action, bending of the hose between cars can occur, which produces momentary volumetric changes in the brake pipe and consequent pressure pulses. In addition, the fact that the mass of air in the brake pipe obeys Newton's laws of motion, a general pressure drop of approximately 0.4 psi. has been measured at the rear of a train during slack run-ins, because the air in motion tends to remain in motion; and during slack run-outs, a general pressure rise has been measured at the rear of the train. The magnitude of these pressure fluctuations varies in proportion to the intensity of the slack action and other train parameters. When combined with quick service activity during service brake applications, these pressure fluctuations may generate a momentary localized brake pipe pressure reduction at an emergency rate or at a rate that so closely approaches an emergency rate that a particularly sensitive control valve will respond to trigger an undesired emergency brake application, as will hereinafter be explained.

The emergency piston in the well-known, industry standard ABD/ABDW control valves operates a slide valve that makes "breather" port connections through which quick action chamber pressure on one side of the emergency piston vents to atmosphere via a "breather" choke when the brake pipe pressure effective on the opposite side of the emergency 10 piston is reduced. The "breather" choke is selected to establish a maximum rate at which the fixed volume quick action chamber pressure is capable of venting. By setting this rate in accordance with a threshold rate of reduction of brake pipe pressure, above which it is desired to trigger an emergency application, a pressure differential is prevented from developing across the emergency piston for a duration sufficient to force the emergency piston to emergency position during service rates of reduction of brake pipe pressure. Only when the reduction of brake pipe pressure exceeds such a threshold rate will it be sufficient to develop and sustain a sufficient pressure differential across the emergency piston to force the emergency piston to emergency position.

In FIG. is shown the emergency portion 1 of the standard ABD/ABDW control valve device having an emergency piston 2 that carries a slide valve 3 that, in turn, establishes the aforementioned "breather" connection between a port v in the slide valve with a port v2 in the slide valve bushing 5. The orifice area of this v/v2 porting connection initially increases as piston 2 moves from point (a) to point (b'), as shown in the graph of FIG. 2 and decreases as piston 2 moves from point (c') to point (d). Point Y on the graph of FIG. 2 represents the orifice area of the "breather" choke 23. It will be apparent from the graph that the effective orifice area of the v/v2 porting corresponds with the fixed orifice area of "breather" choke 23 when piston travel reaches point (b), being less than the orifice area of "breather" choke 23 between points (a) and (b) and greater between points (b) and (c). In the range of piston travel between points (b) and (c), "breather" choke 23 is effective in conjunction with the v/v2 orifice area to limit the aforementioned maximum rate at which the quick action chamber pressure can vent or "breath", this range of travel being commonly referred to as a maximum "breathing" range.

During piston movement beyond point (c') to point (d), the area of the v/v2 porting interface diminishes as port v moves out of communication with port v2, until at point (d) complete cut-off of the venting or "breathing" of quick action chamber pressure occurs. This range of travel of the emergency piston between points (a) and (d) is generally referred to as the "breathing" zone and lies intermediate release position and emergency position of the emergency piston. The piston travel across this "breathing" zone is nominally 0.077 inch.

Since the orifice areas of the v/v2 port connection and "breather" choke 23 are in series between the quick action chamber and atmosphere, the venting or "breathing" of quick action chamber pressure is nearly always influenced by this restriction of both orifices. It will be appreciated, therefore, that the effective "breathing" area of quick action chamber pressure only approximates the curve of FIG. 2.

Movement of emergency piston 2 into the service zone, in response to a pressure differential created by a reduction in brake pipe pressure relative to quick action chamber pressure acting on opposite sides of piston 2, is intended to vent quick action chamber pressure at a "breathing" rate sufficient to counteract the reduction of brake pipe pressure by stabilizing or reducing the pressure differential initiating piston movement to accordingly stabilize the emergency piston, provided the reduction of brake pipe pressure is at a service rate. If the service reduction of brake pipe pressure is at the maximum service rate, the emergency piston will find a position generally in the maximum "breathing" range between points (b) and (c), in which the resultant venting of quick action chamber pressure will counteract the reduction of brake pipe pressure and thereby stabilize the emergency piston. On the other hand, brake pipe pressure reductions at less than the maximum service rate will create a lower initial pressure differential to govern movement of the emergency piston, and the emergency piston will accordingly find a position in the "breathing" zone between points (a) and (b), where the quick action chamber pressure is vented at a less than maximum "breathing" rate, depending upon the degree of v/v2 interface opening. During this stabilization of the emergency piston during service brake applications, it will be understood that the service piston may cycle within the "breathing" zone until it finds the proper position in which the "breathing" of the quick action chamber pressure balances the brake pipe pressure reduction sufficiently to stabilize the piston. It will also be understood that in the event the emergency piston moves beyond position (c), the v/v2 interface opening begins to gradually close, as port v in the slide valve moves past port v2 in the slide valve bushing seat, thereby tending to decrease the venting of quick action chamber pressure. Accordingly, the pressure differential across the emergency piston effecting its movement may not be reversed, but rather may increase due to the decreased rate of quick action chamber venting, thereby forcing the emergency piston to emergency position, wherein the emergency piston slide valve establishes a port connection to initiate the emergency brake appliction function. While this is a normal required function in response to a true emergency rate of reduction of brake pipe pressure, it is also believed to occur in response to the above discussed random fluctuations of brake pipe pressure during service brake applications to cause unintended emergency brake applications, as hereinafrer explained.

The force of the pressure differential required to overcome static friction and initiate movement of the emergency piston from release position to the "breathing" zone is greater than the force required to overcome dynamic friction and maintain continued movement of the piston. The piston momentum, if excessive, due to this initial high differential force and an extremely fast initial rate of brake pipe pressure reduction, can tend to drive the piston beyond the maximum "breathing" range between points (b) and (c), thus aggravating the situation in which a random brake pipe pressure fluctuation occurs. Normally, piston movement will be halted in the "breathing" zone between points (a) and (c) and will hunt or cycle to find the precise position in which the quick action chamber pressure will "breathe" at a rate corresponding to the effective service reduction of brake pipe pressure at that particular valve, thereby stabilizing the piston against further movement beyond point (c). However, if a random brake pipe pressure fluctuation should occur prior to piston movement being halted, the piston momentum coupled with the momentary high pressure differential acting on the piston, due to the pressure fluctuation, can cause the piston to overshoot the maximum "breathing" range (b-c) within the "breathing" zone, before the pressure fluctuation dissipates. The resultant movement of the emergency piston beyond point (c) defining the limit of the maximum "breathing" range, results in progressively reduced "breathing" of quick action chamber pressure, due to reduced orifice area of the v/v2 porting, with consequent loss of the emergency piston stability. When this occurs, the emergency piston will continue to move to emergency position, producing an unintended emergency brake application.

One way of solving this problem would be to decrease the overall emergency piston sensitivity, but this could severely jeopardize the propagation of emergency brake applications, particularly where successive cars are hauled in a train with inoperative control valves and no other means to effect a local emergency venting of brake pipe pressure in response to an emergency brake application.

OBJECTS OF THE INVENTION

It is therefore the principal object of the present invention to increase the emergency piston stability during service brake applications, without loss of emergency sensitivity.

An extension of the principal objective is to load the emergency piston in the maximum "breathing" range of piston travel sufficiently to counteract a brake pipe pressure fluctuation during a service brake application prior to the piston moving to emergency position.

Another extension of the principal objective is to load the emergency piston sufficiently to counteract a brake pipe pressure fluctuation in response to a sudden movement of the emergency piston due to the occurrence of a brake pipe pressure fluctuation during a service brake application prior to the piston moving to emergency position.

Another object of the invention is to limit the maximum loading of the emergency piston in achieving the foregoing objective.

SUMMARY OF THE INVENTION

Briefly, the objective of the invention is achieved in one aspect by providing a caged spring the cover of the emergency valve portion that is normally spaced-apart from the emergency piston in release position and is engageable therewith upon movement of the piston into the maximum "breathing" range of the service zone intermediate the release and emergency application positions. This added spring load is selected to counteract a brake pipe pressure reduction typical of a random brake pipe pressure fluctuation and the piston momentum attributed to the difference between the static and dynamic friction forces acting on the piston, in order to allow the piston to hesitate in the maximum "breathing" range of the service zone. In this sense, the normal "breathing" or venting of quick action chamber pressure is assured to obtain improved emergency piston stability against inappropriate movement to emergency position during a service brake application.

In another aspect of the invention, a choke and check valve are arranged in the cover of the emergency valve portion to produce a dashpot effect when movement of the emergency piston occurs at a rate indicative of a brake pipe pressure fluctuation existing. The amount of air capable of being displaced from the chamber above the emergency piston via the choke is less than the air displaced by the piston during rapid piston movement, thereby creating a back pressure in the piston chamber to counteract piston movement. When the back pressure exceeds a predetermined maximum value, a spring-biased check valve is unseated to allow air flow from the piston chamber in bypass of the dashpot choke. In this manner, the back pressure acting on the emergency piston to counteract its movement in response to a brake pipe pressure fluctuation can be tailored to match a typical brake pipe pressure fluctuation, so as to not affect emergency sensitivity following dissipation of the pressure fluctuation.

BRIEF EXPLANATION OF THE DRAWINGS

These and other objects and advantages of the invention will become apparent from the following more detailed explanation when taken in conjunction with the accompanying drawings, in which.

DESCRIPTION AND OPERATION

Figure 3:
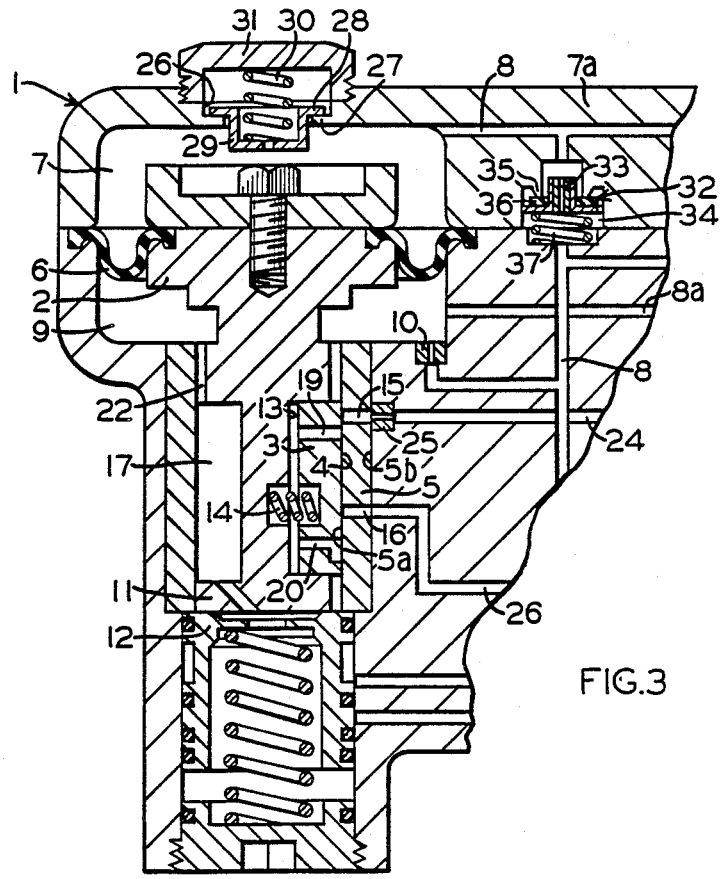
FIG. 3 is a diagrammatic, sectional view of an emergency valve similar to that of FIG. 2, but modified in accordance with the present invention.

Referring to FIG. 3 of the drawings, there is shown incorporated in the emergency portion 1 of a conventional ABD type freight brake control valve device an emergency piston 2 having a slide valve 3, the planar face 4 of which engages the conforming face 5a of a slide valve seat bushing 5. The outer surface of bushing 5 may be tapered to provide a press fit in a bore 5b of the valve body. A diaphragm 6 of piston 2 forms with the valve body cover 7a, a chamber 7 on one side, to which the compressed air carried in the trainline brake pipe (not shown) is connected via a brake pipe branch passage 8, and a chamber 9 on the opposite side subject to the compressed air in a quick action chamber (not shown). The quick action chamber pressure is charged from brake pipe branch passage 8 via a charging choke 10, chamber 9, and a passage 8a, so that during brake pipe charging, the pressure in chamber 7 is greater than the pressure in chamber 9, and the effective force due to this pressure differential acting across the area of the piston establishes and maintains the piston in its lowermost release position (as shown) until such time as the brake pipe pressure is reduced. This release position is determined by engagement of the emergency piston tail 11 with a spring-loaded spool valve 12 that provides the well-known emergency accelerated release function, which is not a part of the present invention.

The emergency piston slide valve 3 is housed within a recess 13 in the emergency piston, so as to move axially with the piston. A spring 14, between the slide valve 3 and the piston 2, urges the slide valve face 4 into engagement with the adjoining face 5a forming the slide valve seat formed in bushing 5 with sufficient force that the lapped interfaces therebetween provide a pressure seal between the porting in the slide valve and seat. Passages 15 and 16 are formed in bushing 5, while passages 19 and 20 are provided in slide valve 3.

A passage 22 is provided in piston 2 via which chamber 9 is communicated with the area 17 surrounding piston tail 11, this area 17 being also communicated with recess 13.

A passage 26 in the valve body cmmunicates with passage 16 in slide valve bushing seat 5 to conduct pilot air to well-known auxiliary valve devices (not shown). A vent passage 24 in the valve body communicates with passage 15 in slide valve bushing seat 5 via a "breather" choke 25.

Figure 1:
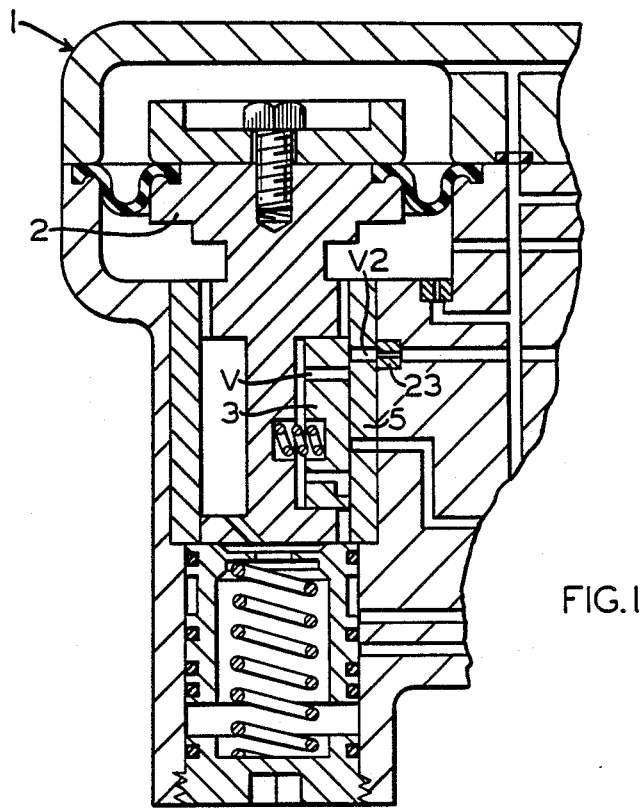
FIG. 1 shows a diagrammatic, sectional view of an emergency valve as employed in the emergency portion of the standard, ABD type freight brake control valve device.
Figure 2:
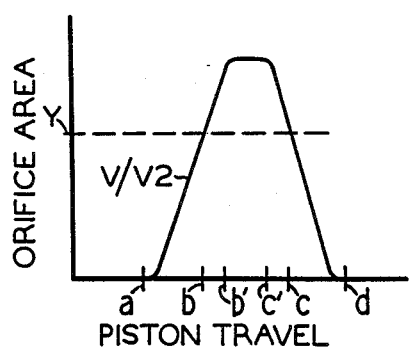
FIG. 2. is a graph plotting "breather" orifice area at the slide valve/seat interface as a function of the emergency piston slide valve travel as achieved in the standard ABD control valve device.

In accordance with one aspect of the present invention, there is provided in cover 7a, a stepped opening 26 forming a ledge 27 on which a shoulder 28 of a spring seat 29 rests. A spring 30 is caged between spring seat 29 and a cap nut 31 that is screwed into cover 7a to maintain spring 30 compressed with a predetermined tension. In release position of emergency position 2, as shown in FIG. 2, slide valve 3 is positioned along seat 5, so that the ports of passages 19, 20 are out of registry with the respective ports of passages 15 and 16 in slide valve bushing 5, thereby blanking quick action chamber pressure at the slide valve/seat interface. Also, spring seat 29 is spaced from emergency piston 2 in the release position shown, such that the initial upward movement of the piston is not influenced by spring 30. During this initial upward movement of piston 2, as occurs in response to a pressure differential being established by the reduction of brake pipe pressure sufficient to overcome static friction, passage 19 is communicated with passage 15 to initiate the venting of quick action chamber air via "breather" choke 25 and exhaust passage 24. This initial venting of quick action chamber air is represented in the graph of FIG. 2 as occurring between points (a-b) in the "breathing" zone of piston travel. Full port communication and thus maximum venting or "breathing" of quick action chamber air occurs between points (b-c) in the "breathing" zone. In this maximum "breathing" range, piston travel is sufficient to cause piston 2 to be loaded by the tension of caged spring 30, as piston 2 engages and displaces spring seat 29 from its normal position on shoulder 28. Spring 30 thus exerts a relatively light downward force on piston 2 in the maximum "breathing" range (b-c) sufficient to counteract an upward-acting force thereon, due to a momentarily high force differential that can result from a random brake pipe pressure fluctuation, particularly when compounded by the effect of piston momentum, once static friction is overcome. In counteracting upward forces on piston 2 in this manner, the momentum of piston 2 is assured of being arrested in the maximum "breathing" range (b-c) of the "breathing" zone, wherein maximum venting of quick action chamber air is provided to counteract a service rate of brake pipe pressure reduction. Assuming initial upward movement of piston 2 has occurred as a result of a service reduction of brake pipe pressure effective in chamber 7 above piston 2, the reduction of quick action chamber pressure effective in chamber 9 will prevent continued upward movement of piston 2 to emergency position. Accordingly, the degree of emergency piston stability is higher than that capable of being achieved in known emergency valves of the type discussed.

In another aspect of the invention, a combination one-way check valve 32 and choke 33 is housed within cover 7a in an opening 34 of branch passage 8. Check valve 32 includes a valve seat 35 and a valve element 36 that is biased into engagement with valve seat 35 by a spring 37. The size of choke 33 is selected so as to not excessively restrict flow of brake pipe air during a service rate of brake pipe pressure reduction. In the event, however, a service rate of brake pipe pressure reduction is accompanied by a momentary brake pipe pressure fluctuation, so as to produce a relatively high pressure differential across the piston in response to which more rapid than normal piston movement occurs, the flow capacity of choke 33 will be insufficient to dissipate the air displaced from chamber 7, in the relatively short time period this rapid piston movement takes place. Accordingly, a back pressure is created in chamber 7 by this dashpot effect to exert a downward-acting force on piston 2, and thereby suppress continued upward movement of the piston beyond the maximum "breathing" range (b-c) of piston travel. In this manner, as in the case of spring 30, the momentum of piston 2 is arrested to assure the venting of quick action chamber pressure, and thereby stabilize emergency piston 2 from continued movement to emergency position during a service rate of reduction of brake pipe pressure.

In order to prevent the back pressure in chamber 7 from exceeding a predetermined value above which emergency sensitivity would be adversely affected, spring 37 is selected to allow check valve 32 to be unseated in response to back pressure in chamber 7 exceeding this predetermined value. When this occurs, the pressure in chamber 7 follows the reduction of brake pipe pressure in bypass of choke 33 until the chamber 7 pressure is reduced below the predetermined value set by spring 37.

While the two aspects of the invention may be used independently of each other to achieve the desired improvement in emergency stability, it will be appreciated that the force due to back pressure achieved by dashpot choke 33, when employed in conjunction with the retarding force of caged spring 30, allows the force of spring 30 to be less than would otherwise be necessary, thereby assuring that the desired emergency sensitivity is preserved.

When an emergency rate of brake pipe pressure reduction is made, the maximum rate at which quick action chamber pressure is vented via "breather" choke 25 is insufficient to counteract the resultant force differential created across piston 2, irrespective of the supplemental forces of caged spring 30 and back pressure due to dashpot choke 33. Accordingly, piston 2 is forced beyond point (c) in the "breathing" zone toward emergency position at point (d). As this occurs, quick action chamber "breathing" diminishes and thereby further encouraging development of a force differential across piston 2 sufficient to assure continued movement of the piston and slide valve to emergency position in which slide valve passage 19 is moved beyond passage 15 in bushing 5, thereby completely cutting off further "breathing" of quick action chamber pressure. In emergency position, passage 20 in slide valve 3 is communicated with passage 16 in bushing seat 5, whereby quick action chamber pressure is connected from area 17 and recess 13 to passage 23 to pilot an emergency brake application in the usual, well-known manner.

We claim:

1. An emergency valve device comprising:
   (a) an emergency piston movable from a release position toward an emergency position in response to a differential actuating force on said piston when the fluid pressure in a brake pipe acting on one side of said piston is reduced relative to the fluid pressure in a quick action chamber acting on the other side thereof;
   (b) valve means operable in response to movement of said piston in a "breathing" zone intermediate said release and emergency positions for establishing a fluid flow path via which quick action chamber fluid under pressure is vented;
   (c) a "breather" choke in said fluid flow path to establish said rate of venting of said quick action chamber fluid under pressure such as to prevent said piston from moving to said emergency position except when said reduction of said brake pipe fluid under pressure exceeds a predetermined service rate; and
   (d) means for providing a supplemental force acting on said piston in opposition to said actuating force to suppress movement of said piston to said emergency position when said reduction of said brake pipe fluid pressure occurs only momentarily at a rate exceeding said service rate.

2. An emergency valve device, as recited in claim 1, wherein said means for providing a supplemental force comprises a spring.

3. An emergency valve device, as recited in claim 2, wherein said spring is caged within the body of said emergency valve device so as to be spaced from said piston a predetermined distance in said release position of said emergency piston.

4. An emergency valve device, as recited in claim 3, wherein said predetermined distance corresponds to said movement of said piston from said release position to said "breathing" zone.

5. An emergency valve device, as recited in claim 1, wherein said means for providing a supplemental force comprises a dashpot choke via which said reduction of said brake pipe fluid under pressure acting on said one side of said piston occurs.

6. An emergency valve device, as recited in claim 5, wherein the size of said dashpot choke is such as to create a back pressure acting on said one side of said piston to provide said supplemental force when said movement of said piston from said release position to said "breathing" zone occurs in response to a rate of brake pipe pressure reduction that exceeds said service rate.

7. An emergency valve device, as recited in claim 6, wherein said back pressure is limited to a predetermined value.

8. An emergency valve device, as recited in claim 7, further comprising one-way check valve means for effecting said reduction of said brake pipe fluid under pressure acting on said one side of said piston in bypass of said dashpot choke when said back pressure exceeds said predetermined value.

9. An emergency valve device, as recited in claim 1, wherein said means for providing said supplemental force comprises:
   (a) a spring caged within the body of said emergency valve device so as to be spaced from said piston a predetermined distance in said release position of said emergency piston; and
   (b) a dashpot choke via which said reduction of said brake pipe fluid under pressure acting on said one side of said piston occurs, the size of said dashpot choke being such as to create a back pressure acting on said one side of said piston to provide said supplemental force when said movement of said piston from said release position to said "breathing" zone occurs in response to a rate of brake pipe pressure reduction that exceeds said service rate.

10. An emergency valve device, as recited in claim 9, further comprising one-way check valve means for effecting said reduction of said brake pipe fluid under pressure acting on said one side of said piston in bypass of said dashpot choke when said back pressure exceeds said predetermined value.

* * * * *